United States Patent
Maxfield (10) Patent No.: US 12,512,004 B2
(45) Date of Patent: Dec. 30, 2025

(54) STOPPING INDICATOR SYSTEM ON THREE-DIMENSIONAL VEHICLE DISPLAY

(71) Applicant: Honeywell International Inc., Charlotte, NC (US)

(72) Inventor: Jacob K. Maxfield, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 295 days.

(21) Appl. No.: 18/298,946

(22) Filed: Apr. 11, 2023

(65) Prior Publication Data

US 2024/0346934 A1   Oct. 17, 2024

(51) Int. Cl.
*G08G 5/21*  (2025.01)
*G08G 5/26*  (2025.01)
*G08G 5/50*  (2025.01)
*G08G 5/55*  (2025.01)

(52) U.S. Cl.
CPC .............. *G08G 5/21* (2025.01); *G08G 5/26* (2025.01); *G08G 5/50* (2025.01); *G08G 5/55* (2025.01)

(58) Field of Classification Search
CPC .. G08G 5/21; G08G 5/26; G08G 5/50; G08G 5/55; G08G 5/54; G01C 23/00
See application file for complete search history.

(56) References Cited

U.S. PATENT DOCUMENTS

| | | | |
|---|---|---|---|
| 2005/0237226 A1* | 10/2005 | Judge | H04L 9/40 340/967 |
| 2007/0030174 A1 | 2/2007 | Randazzo et al. | |
| 2010/0168939 A1 | 7/2010 | Doeppner et al. | |
| 2016/0152348 A1* | 6/2016 | Mohideen | G01C 23/005 701/16 |
| 2021/0225180 A1 | 7/2021 | Anoop et al. | |
| 2021/0365050 A1* | 11/2021 | P R | G08G 5/34 |
| 2022/0028281 A1* | 1/2022 | Byxbe | G08G 5/723 |

FOREIGN PATENT DOCUMENTS

EP   4015375 A1   6/2022

OTHER PUBLICATIONS

Extended European Search Report Mailed on Aug. 22, 2024 for EP Application No. 24164492, 12 page(s).
Communication about intention to grant a European patent Mailed on Oct. 31, 2025 for EP Application No. 24164492, 6 page(s).

* cited by examiner

*Primary Examiner* — Brandon D Lee
(74) *Attorney, Agent, or Firm* — ALSTON & BIRD LLP (57) ABSTRACT

A method of displaying a preferred stopping distance comprising: receiving a current location of an vehicle relative to a landing pad; calculating a deceleration of a lower bound of the preferred stopping distance symbol; calculating a deceleration of a upper bound of the preferred stopping distance symbol; calculating a predicted stopping ground location of the upper bound and lower bound; and displaying the preferred stopping distance symbol on a graphic user interface. A stopping indicator system on a three-dimensional display includes a flight path vector symbol, a landing pad symbol, a waypoint symbol positioned at some altitude above the landing pad symbol, a nearest predicted stopping symbol, a preferred stopping distance symbol, and a predicted stopping location symbol.

18 Claims, 4 Drawing Sheets

STOPPING INDICATOR SYSTEM ON THREE-DIMENSIONAL VEHICLE DISPLAY

TECHNICAL FIELD

Various embodiments of the present disclosure relate generally to the field of aviation navigation and, more particularly, a stopping indicator system for a three-dimensional display of an aircraft.

BACKGROUND

Electric vertical take-off and landing eVTOL vehicles hover flight consumes large amounts of energy and is very taxing on their power systems. In order for these vehicles to be utilized for daily use, they need to spend as little time in the powered lift configuration as possible. Ideally, the eVTOL vehicles will remain in their lift-on-wing configuration for a significant portion of their flight, transitioning through to hover flight and landing as quickly, efficiently, and as safely as possible. Automated flight systems will likely solve this in the long run. However, the accompanying vehicle and ground systems and infrastructure are costly and regulations for this type of environment is not fully developed. The present disclosure is directed to overcoming one or more of these above-referenced challenges.

SUMMARY OF THE DISCLOSURE

In some aspects, the techniques described herein relate to a stopping indicator system on a three-dimensional display, the system comprising: a flight path vector symbol; a landing pad symbol; a waypoint symbol positioned at some altitude above the landing pad symbol; a nearest predicted stopping symbol; a preferred stopping distance symbol; and a predicted stopping location symbol.

In some aspects, the techniques described herein relate to a system, wherein the landing pad symbol is positioned on a ground of the three-dimensional display.

In some aspects, the techniques described herein relate to a system, wherein the predicted stopping location symbol is displayed if a deceleration is less than zero.

In some aspects, the techniques described herein relate to a system, wherein the landing pad symbol and the waypoint symbol are positioned at a pre-determined latitude and longitude.

In some aspects, the techniques described herein relate to a system, wherein the predicted stopping location symbol is displayed on the ground of the three-dimensional display.

In some aspects, the techniques described herein relate to a system, wherein the landing pad symbol is positioned on a runway, building, or an elevated terrain.

In some aspects, the techniques described herein relate to a system, wherein a upper point of the preferred stopping distance is a percentage of a maximum deceleration.

In some aspects, the techniques described herein relate to a system comprising: a display including one or more screens; a memory storing instructions; and a processor executing the instructions display a stopping indicator system on a three dimensional display to one or more operators of an aircraft including: a flight path vector symbol; a landing pad symbol; a waypoint symbol; wherein the waypoint symbol is positioned at some altitude above the landing pad symbol; a nearest predicted stopping symbol; a preferred stopping distance symbol; wherein the preferred stopping distance symbol includes a upper range and lower range; and a predicted stopping symbol.

In some aspects, the techniques described herein relate to a system, wherein the landing pad symbol is positioned on a ground of a three-dimensional display.

In some aspects, the techniques described herein relate to a system, wherein the predicted stopping location symbol is displayed if a deceleration is less than zero.

In some aspects, the techniques described herein relate to a system, wherein the landing pad symbol and the waypoint symbol are positioned at a pre-determined latitude and longitude.

In some aspects, the techniques described herein relate to a system, wherein the predicted stopping location symbol is displayed on the ground of a three-dimensional display.

In some aspects, the techniques described herein relate to a system, wherein the landing pad symbol is positioned on a runway, building, or an elevated terrain.

In some aspects, the techniques described herein relate to a system, wherein the landing pad symbol is positioned on a runway, building, or an elevated terrain.

In some aspects, the techniques described herein relate to a system, wherein a upper point of the preferred stopping distance is a percentage of a maximum deceleration.

In some aspects, the techniques described herein relate to a method of displaying a preferred stopping distance, the method comprising: receiving a current location of an vehicle relative to a landing pad; calculating a deceleration of a lower bound of the preferred stopping distance symbol; calculating a deceleration of a upper bound of the preferred stopping distance symbol; calculating a predicted stopping ground location of the upper bound and lower bound; displaying the preferred stopping distance symbol on a graphic user interface.

In some aspects, the techniques described herein relate to a method, wherein the deceleration of the lower bound is a percentage of a maximum deceleration.

In some aspects, the techniques described herein relate to a method, wherein the deceleration of the upper bound is a percentage of a maximum deceleration.

In some aspects, the techniques described herein relate to a method, wherein the predicted stopping location of the lower bound is calculated by a ground speed of the vehicle divided by the deceleration of the lower bound.

In some aspects, the techniques described herein relate to a method, wherein the predicted stopping location of the lower is calculated by a ground speed of the vehicle divided by the deceleration of the upper bound.

In some aspects, the techniques described herein relate to a method, wherein the processor calculates decelerations of a range of points between the lower bound and upper bound.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to the field of navigation for urban air mobility vehicles and, more particularly, to a stopping indicator system on a three-dimensional display of an aircraft, such as an urban air mobility vehicle.

Hover flight associated with electric vertical take-off and landing eVTOL vehicles can be very taxing on their power systems. In order for these vehicles to be utilized for daily use, they need to spend as little time in the powered lift configuration as possible. Ideally, the eVTOL vehicles will remain in their lift-on-wing configuration for a significant portion of their flight, transitioning through to hover flight and landing as quickly, efficiently, and as safely as possible. Automated flight systems will likely solve this in the long run. However, the accompanying vehicle and ground systems and infrastructure are costly and regulations for this type of environment is not fully developed.

In general, the present disclosure is directed to systems that are able to address one or more of the above challenges by providing a stopping indicator system for a three-dimensional display to assist operators in more efficiently landing a vehicle. One or more embodiments may provide an interface where a pilot can use the stopping indicator indicators on the primary flight display and manually navigate an eVTOL vehicle for an optimized and efficient landing for that particular vehicle.

One or more embodiments may help aircraft manufacturers to develop vehicles that are more efficient and do not need to have the complexity or weight of more batteries. One or more embodiments may allow for a reduced time for a pilot to be trained in landing a given vehicle, resulting in less costs for training.

While this disclosure describes the systems and methods with reference to aircraft, it should be appreciated that the present systems and methods may be applicable to various other vehicles, including those of drones, automobiles, ships, spacecraft, or any other manned, unmanned, autonomous, and/or internet-connected vehicles.

Figure 1:
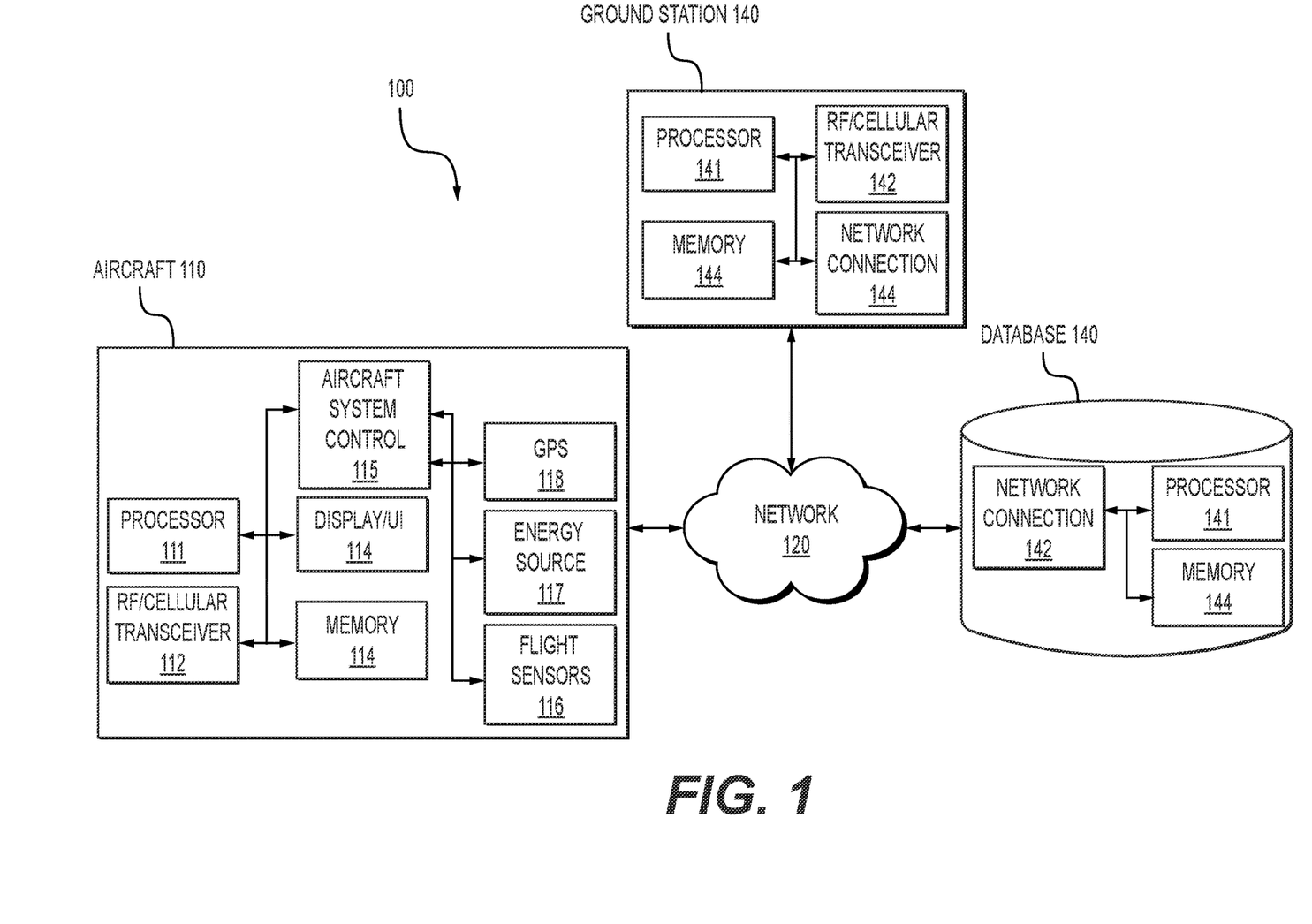
FIG. 1 depicts an exemplary system environment in which methods, systems, and other aspects of the present disclosure may be implemented.

FIG. 1 depicts an exemplary system environment in which methods, systems, and other aspects of the present disclosure may be implemented. The system environment 100 of FIG. 1 may include an aircraft 110, a network 120, one or more ground stations 130, and a database 140. Aircraft 110 may include processor 111 in communication with a plurality of other components such as RF/cellular transceiver 112, memory 113, display/user interface (UI) 114, aircraft control system 115, flight sensors 116, energy source 117, and GPS 118. Processor 111 may include one or more processors that comprise the computing and flight management systems of aircraft 110. Memory 113 may be one or more components configured to store data related to aircraft 110, including instructions for operating flight components and aircraft systems (e.g., autopilot, route planning, communication). Processor 111 and memory 113 may display information to, and receive inputs from an operator of aircraft 110 via display/UI 114. Display/UI 114 may be of any suitable type, such as one or more monitors, touchscreen panels, heads-up displays, and may include operator input devices such as joysticks, buttons, touch-responsive panels, mice, trackpads, voice recognition devices, and the like.

Aircraft 110 can include aircraft control system 115 to serve as the controller of flight components and aircraft systems (e.g., control surfaces, propulsion, energy generation/management). In some embodiments, aircraft control system 115 may communicate with GPS 118 in order to, for example, locate aircraft 110 in the airspace; energy source 117 to, for example, manage aircraft range and speed; and flight sensors 116 to, for example, monitor the operating and flight characteristics of aircraft 110. Without deviating from the scope of this disclosure, aircraft 110 may have additional elements that can be in communication with aircraft control system 115 and/or processor 111.

Aircraft 110 may use RF/cellular transceiver 112 to communicate with other elements of the system environment, for example, via network 120 or directly by radio communication. Network 120 may be implemented as, for example, the Internet, a wireless network, Bluetooth, Near Field Communication (NFC), or any other type of network or combination of networks that provides communications between one or more components of the system environment 100. In some embodiments, the network 120 may be implemented using a suitable communication protocol or combination of protocols such as a wired or wireless Internet connection in combination with a cellular data network.

To aid and/or guide aircraft 110, one or more ground stations 130 may provide aircraft 110 with information, such as information regarding air traffic, weather conditions, and/or other information useful for the flight of aircraft 110. A ground station 130 may include a processor 131, an RF/cellular transceiver 132, memory 133, and network connection 134. Processor 131 and memory 133 may collect and transmit information via RF/cellular transceiver 132 and/or network connection 134. Ground station 130 may be in communication with, for example, air traffic control, meteorologists, and one or more databases 140.

One or more databases 140 may be repositories for system information such as map data, building data, flight plan data, and the like. Database 140 may include a processor 141, a network connection 142, and a memory 143. Memory 143 may store data, processor 141 may access and organize the stored data to respond to requests and provide updates to the stored data, and information may be provided to other elements in system environment 100 via network connection 142. In some embodiments, database 140 may communicate directly with aircraft 110 via network 120. Further, ground station 130 may be able to relay requests for information from aircraft 110 to database 140 via one or more of its RF/cellular transceiver 132 and network connection 134.

Figure 2:
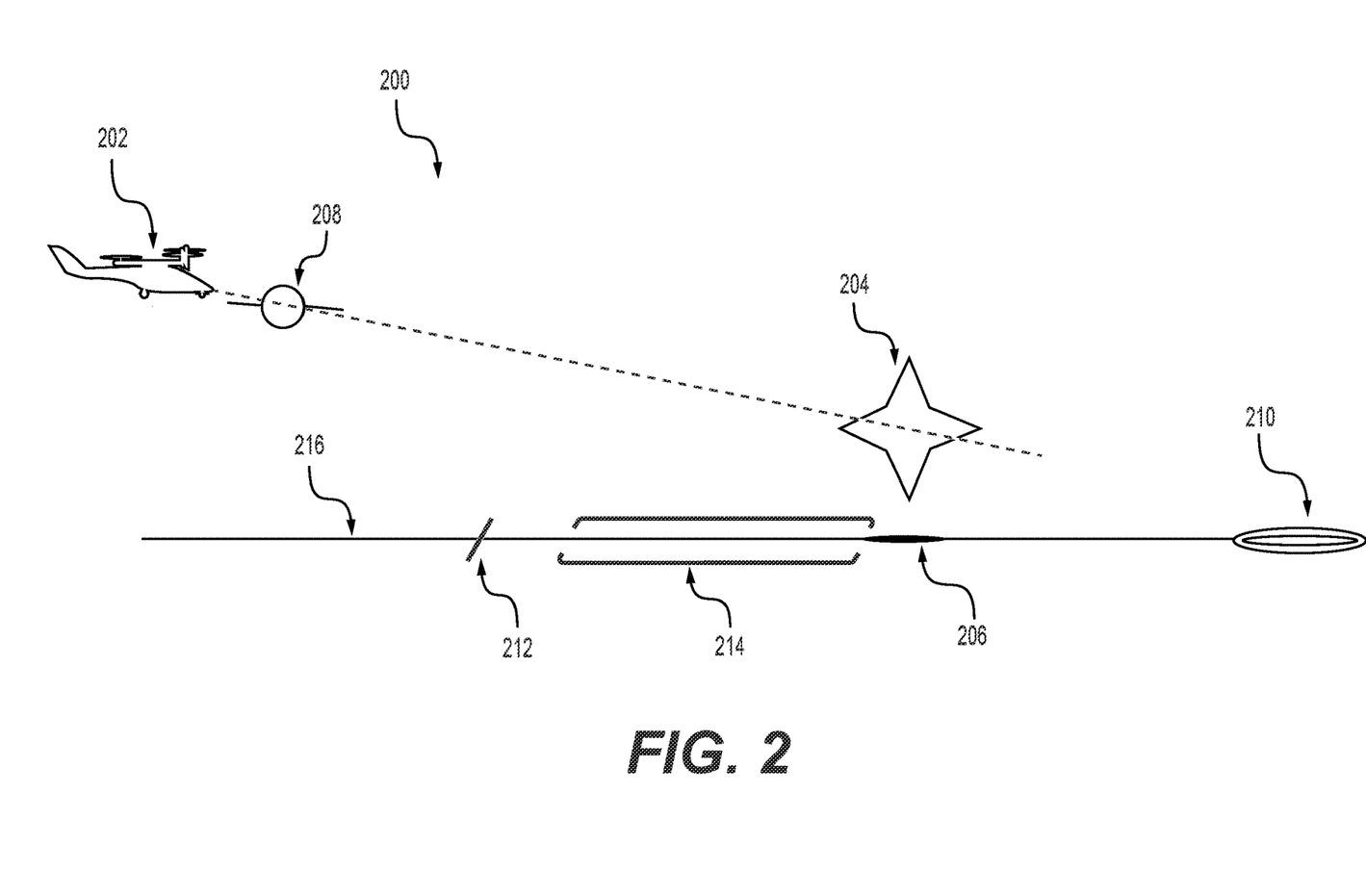
FIG. 2 depicts a stopping indicator system, according to one or more embodiments.

FIG. 2 illustrates the stopping indicator system 200 in accordance with embodiments of the present disclosure. The system 200 may include an aircraft 202, waypoint symbol 204, landing pad symbol 206, flight path vector symbol 208, predicted stopping location symbol 210, maximum deceleration location symbol 212, and preferred stopping distance 214. Throughout the operation of the aircraft 202, the symbols may be displayed on a graphic user interface from takeoff to landing. The symbols may be displayed on a graphic user interface when the aircraft 202 is a certain distance away from the waypoint 204 or landing pad 206.

The predicted stopping location symbol 210 may be displayed on a three-dimensional display if the deceleration of the aircraft 202 may be less than zero or at some predefined deceleration point. The predicted stopping location symbol is located on the 'ground' of the three-dimensional synthetic vision display along the track angle 216 of the aircraft 202. A latitude and a longitude along with its associated ground elevation may define the location of the predicted stopping location symbol 210. The distance that the predicted stopping location symbol 210 is placed along the track line away from the aircraft 202 is based on the ground speed squared divided by the instantaneous deceleration of the aircraft 202. For example, if the aircraft 202, has a ground speed of 100 feet per second and the aircraft operator is decelerating at −20 feet per second per second, the predicted stopping location symbol 210 may be located 500 feet away from the aircraft 202. If the aircraft 202 has a constant ground speed, the predicted stopping may be displayed because it may be beyond the horizon or vanishing point of the display at some infinite distance.

Waypoint symbol 204 may be positioned at some predetermined latitude (x) and longitude (y) position above a landing pad symbol 206. An operator of aircraft 202 may position the waypoint at an altitude the operator may want to have the aircraft 202 reach a ground speed of zero and come to a hover. The aircraft operator may align the flight path vector symbol 208 with the waypoint symbol while approaching. If the waypoint symbol is omitted, the aircraft operator will not be able to judge their altitude at the point at which they will come to a hover.

, The altitude of the waypoint symbol 204 may be predicted using the flight sensors 116 in tandem with energy source 117 to determine at which altitude the aircraft 202 may conserve the most energy. The pilot may be able to override the predicted altitude due to conditions such as weather or location of the landing pad.

Landing pad symbol 206 may be positioned at a predetermined latitude and longitude position. Landing pad symbol 206 may be positioned on a runway, a building, or any elevated terrain. The landing pad 206 and predicted stopping point symbol 210 may be located at the same altitude, with the waypoint 204 also being at the same altitude or at a higher altitude.

A nearest predicted stopping point symbol 212 may indicate where, if the pilot were to command maximum deceleration at a given moment, the predicted point of the vehicle would come to a stop. Nearest predicted stopping point symbol 212 may indicate that if the landing pad 206 is located between aircraft 202 and nearest predicted stopping point symbol 212 symbol, the operator may not be able to stop aircraft 202 for landing.

A preferred stopping distance symbol 214 may indicate a range of points at which the aircraft operator may start decelerating aircraft 202 to reach a hover on waypoint symbol 204. The upper bound of the preferred stopping distance symbol 214 may be some percentage of the maximum deceleration of the aircraft chosen by the aircraft manufacturer. For example, if the maximum deceleration of the aircraft is 50 feet per second per second, a manufacturer may select the upper bound of the preferred stopping distance symbol to be 30% of the maximum deceleration of the aircraft 202. The range of decelerating points may include a lower bound of the preferred stopping distance symbol 214 with a deceleration of approximately 15 feet per second per second and a lower bound may be approximately 40 feet per second per second. A manufacturer may increase the range or decrease the range based on factors such as energy efficiency of the aircraft and mechanical specifications of the aircraft. As the aircraft 202 is approaching the landing pad symbol 206, the landing pad symbol 206 may be encapsulated inside of the suggest stopping location symbol 214 and may signal the aircraft 202 operator to start decelerating in order to efficiently reach a hover. If the aircraft operator decelerates within the range of points of the preferred stopping distance symbol 214, the predicted stopping indicator 210 may move to the location of the landing pad symbol 206. If the preferred stopping distance symbol 214 passes the landing pad symbol, the aircraft operator only option may be to decelerate at the maximum deceleration of the aircraft in order to hover at the waypoint 204. Before the preferred stopping distance symbol 214 passes through the landing pad symbol 206, the preferred stopping distance symbol 214 may be one color but may start flashing as it encapsulates the landing pad symbol 206. Without the suggest stopping location symbol 214, the pilot may initiate the deceleration too soon and drag out the deceleration process longer than desired for efficient transition and landing maneuver.

Figure 3:
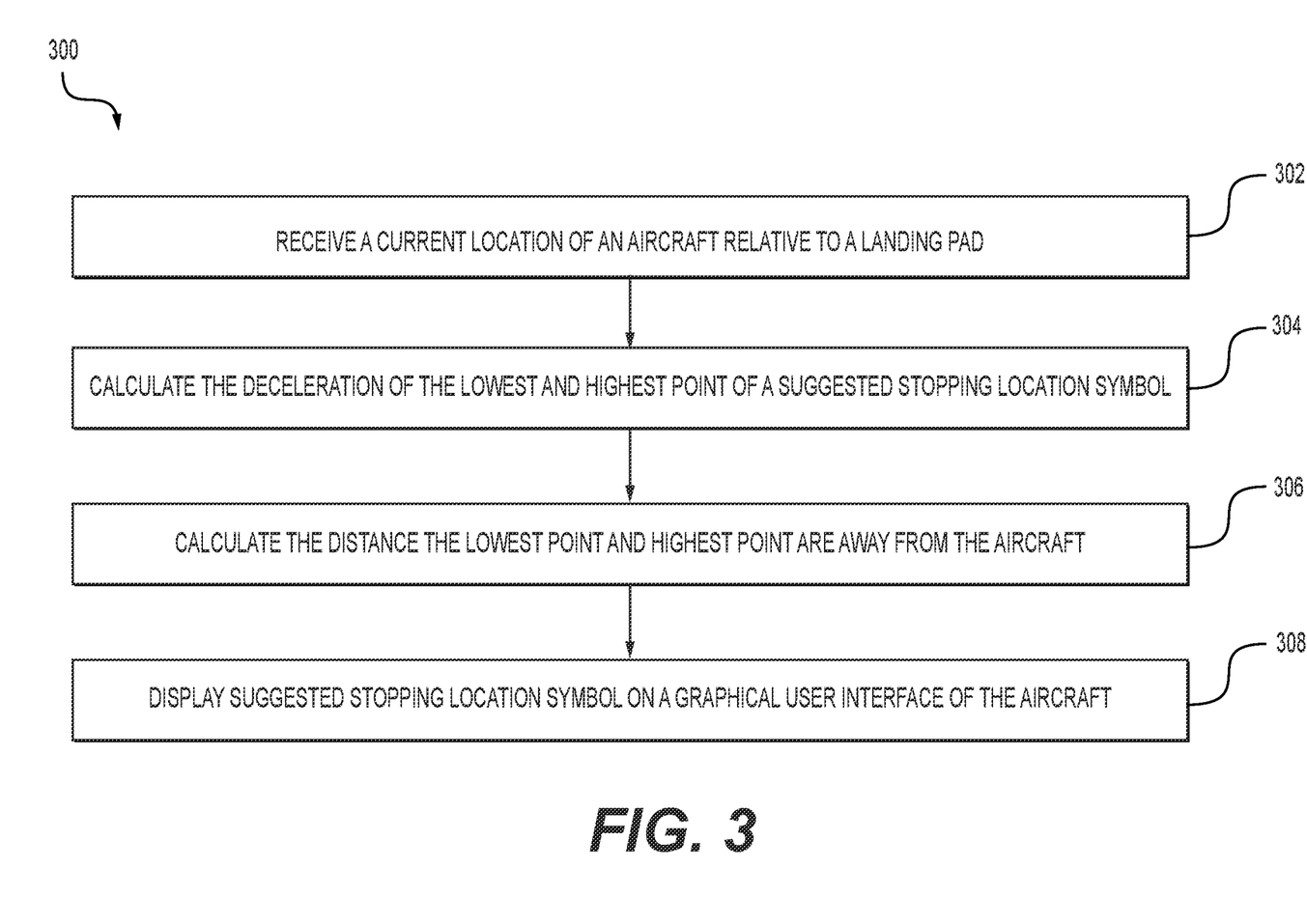
FIG. 3 depicts an exemplary method for displaying a preferred stopping distance symbol on a three-dimensional display.

FIG. 3 depicts an exemplary method 300 for displaying a preferred stopping distance symbol on a three-dimensional display. It should be understood that the steps shown and described herein, and the sequence in which they are presented, are merely illustrative such that various embodiments may include additional and/or fewer steps without departing from a scope of this disclosure.

At step 302, aircraft system control 115 may communicate with flight sensors 116 and GPS 118 to receive a current location of an aircraft 202 relative to landing pad 206 or waypoint 204. The current location of the aircraft 110 may be stored in memory 114.

At step 304, processor 111 may calculate a deceleration of a lower bound, upper bound, and a range of points in between the lower and upper bound of the preferred stopping distance symbol 214. Processor 111 may receive a maximum deceleration of aircraft 110 from memory 114 and calculate a deceleration of the lower bound of the preferred stopping distance symbol 214. The deceleration of the lower bound of the preferred stopping distance may be a percentage of the maximum deceleration. The deceleration of the lower bound of the preferred stopping distance symbol 214 may have the highest deceleration. For example, if the maximum deceleration is 50 feet per second per second, processor 111 may calculate a deceleration to be 40 feet per second per second or 80 percent of the maximum deceleration. Processor 111 may calculate a deceleration of the upper bound of the preferred stopping distance symbol. The deceleration of the upper bound of the preferred stopping distance symbol 214 may be a percentage of the maximum deceleration. The deceleration of the upper bound of the preferred stopping distance symbol may have the lowest deceleration.

At step 306, processor 111 may calculate the predicted stopping ground location of the lower bound given the deceleration of the lower bound. The predicted stopping ground location of the lower bound of the preferred stopping distance symbol 214 may be calculated by the ground speed squared of the aircraft 110 divided by deceleration of the lower bound calculated at step 304. Processor 111 may calculate the predicted stopping ground location of the upper bound given the deceleration of the upper bound. The predicted stopping ground location of the upper bound of the preferred stopping distance symbol 214. may be calculated by the ground speed squared of the aircraft 110 divided by the deceleration of the upper bound calculated at step 304 preferred stopping distance. the distance between the predicted stopping ground location of the lower bound of the preferred stopping distance symbol 214 and aircraft 110 may be less than the distance between predicted stopping ground location of the upper bound of the preferred stopping distance symbol 214 and aircraft 110. Processor 111 may calculate the predicted stopping location of the range of points in between the lower bound and upper bound of the preferred stopping distance symbol 214.

At step 312, processor 111 may display on GUI 40 the predicted stopping ground location of the lower bound and the predicted stopping ground location of the upper bound point of the preferred stopping distance symbol 214. Processor 111 may display the range of points between the lower bound and upper bound of the preferred stopping distance symbol 214.

Figure 4:
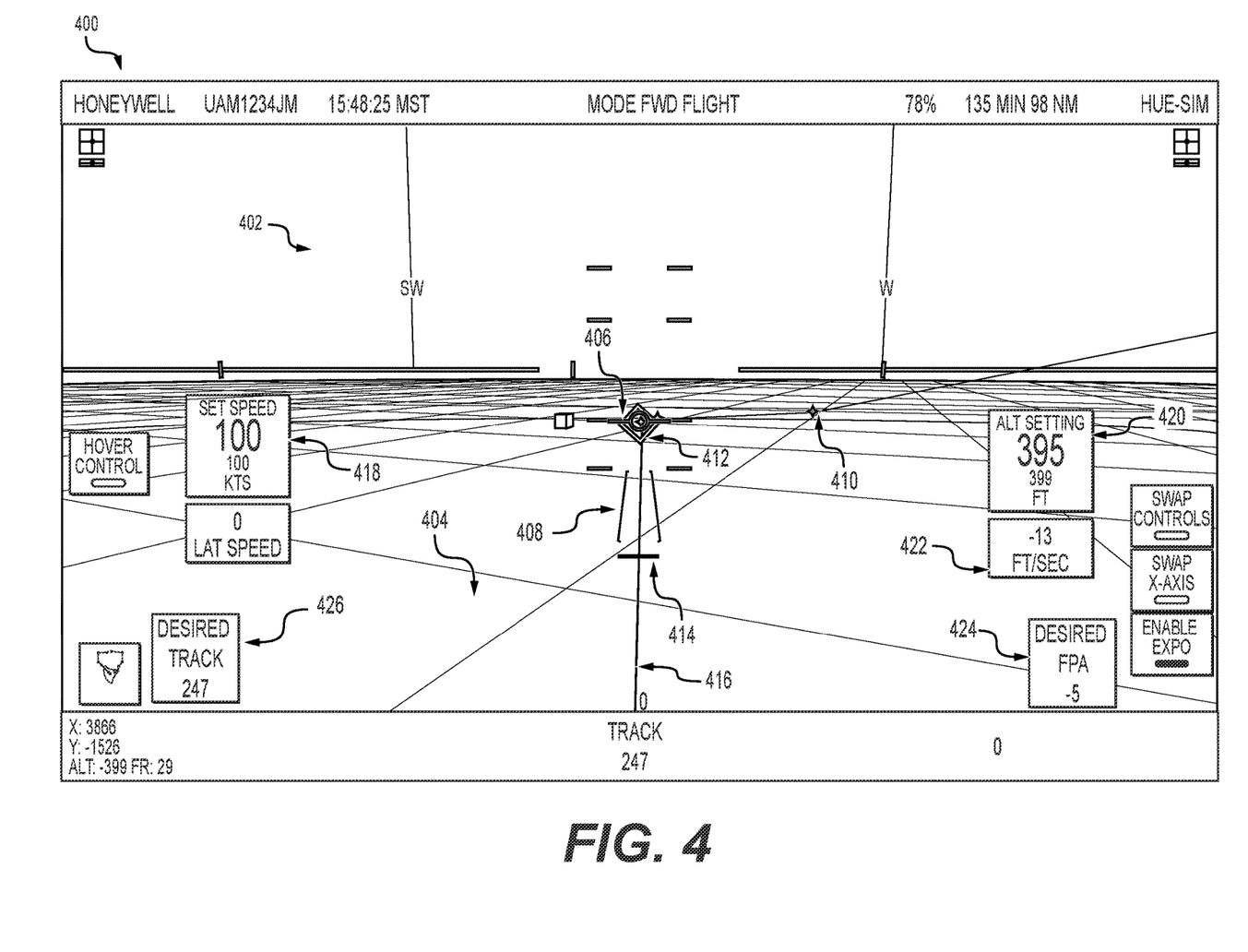
FIG. 4 depicts an exemplary graphical user interface indicating stopping indicator system, according to one or more embodiments.

Now referring to FIG. 4, the exemplary GUI 400 may include an airspace 402, terrain 404, fight path vector symbol 406, preferred stopping distance symbol 408, waypoint symbol 410, suggested intercept angle symbol 412, maximum deceleration location symbol 414, intended path 416, ground speed 418, altitude indicator 420, deceleration indicator 422, desired flight path angle indicator 424, and desired track angle 426. The visual characteristics assigned to each symbol may include such variations as, for example, color, opacity, texture, symbology, luminescence, and/or visual effects such as blinking or flashing. In some embodiments, the operator of aircraft 110 may be able to determine their own set of visual characteristics based on a preference, such as the use of a preferred color for the destination or the avoidance of colors that the operator may not be able to distinguish (e.g., an operator with red-green color blindness). Furthermore, in order to generate terrain 404 on GUI 400, processor 110 may communicate through network to gather terrain data stored in database. GUI 400 gives the operator of the aircraft enough tactical awareness to guide the aircraft without having to rely too much on feedback received from flying the aircraft.

In another embodiment, GUI 400 may also obtain data gathered from the aircraft sensors to display indicators such as an airspeed indicator, ground speed indicator, altitude indicator, vertical speed indicator, suggested intercept angle, and weather indicator. The operator of the aircraft may be able to select which indicators that he or she would want displayed in order to reduce clutter and allow the operator to track the intended path.

One or more embodiments may provide an interface where a pilot can use the stopping indicator indicators on the primary flight display and manually navigate an eVTOL vehicle for an optimized and efficient landing for that particular vehicle. One or more embodiments may help aircraft manufacturers to develop vehicles that are more efficient and do not need to have the complexity or weight of more batteries. One or more embodiments may allow for a reduced time for a pilot to be trained in landing a given vehicle, resulting in less costs for training.

Systems providing a stopping on a three-dimensional display to an aircraft operators in accordance with the present disclosure may be able to provide an aircraft operator with contextually relevant along the aircraft's path in a visual manner. Displaying three-dimensional navigation imagery that visually represents characteristics or features that may be relevant to the aircraft's current or future phase of flight may reduce or eliminate the need for an aircraft operator to manually change displays or consult separate lists or displays to receive relevant information. By automatically providing information that may answer some of the questions an aircraft operator may have at a particular time, and by reducing the amount an aircraft operator may have to shift their focus to another display or to manually change/adjust a display, aircraft operators may exhibit an increased awareness of how the aircraft may safely proceed through the airspace at any given time.

The general discussion of this disclosure provides a brief, general description of a suitable computing environment in which the present disclosure may be implemented. In one embodiment, any of the disclosed systems and/or methods may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the embodiments disclosed herein. It is intended that the specification and examples be considered as exemplary only, with a true scope and spirit of the present disclosure being indicated by the following claims.

What is claimed is:

1. A computer-implemented method of displaying a preferred stopping distance for an aircraft via a stopping indicator system on a three-dimensional display, the computer-implemented method comprising:
   communicating with a Global Positioning System to receive a current location of the aircraft relative to a landing pad;
   receiving a maximum deceleration of the aircraft from memory;
   calculating a deceleration of a lower bound of the preferred stopping distance and a deceleration of an upper bound of the preferred stopping distance;
   displaying a landing pad symbol on a graphic user interface of the three-dimensional display at a predetermined position, wherein the landing pad symbol is positioned on a ground of the three-dimensional display;
   calculating predicted stopping ground locations of the upper bound and lower bound based on the deceleration of the upper bound and the deceleration of the lower bound; and
   displaying a preferred stopping distance symbol on the graphic user interface of the three-dimensional display at the predicted stopping ground locations, wherein the preferred stopping distance symbol is configured to indicate a range of points at which an aircraft operator may start decelerating the aircraft to reach hover above the landing pad.

2. The computer-implemented method of claim 1, wherein the deceleration of the lower bound is a percentage of the maximum deceleration.

3. The computer-implemented method of claim 1, wherein the deceleration of the upper bound is a percentage of the maximum deceleration.

4. The computer-implemented method of claim 1, wherein the predicted stopping ground locations of the lower bound are calculated based on a ground speed of the aircraft divided by the deceleration of the lower bound.

5. The computer-implemented method of claim 1, wherein the predicted stopping ground locations of the upper bound are calculated based on a ground speed of the aircraft divided by the deceleration of the upper bound.

6. The computer-implemented method of claim 1, further comprising calculating one or more decelerations of a range of points between the lower bound and the upper bound.

7. A system comprising:
   a display including one or more screens;
   a memory storing instructions; and
   a processor executing the instructions to cause display of a stopping indicator system on a three-dimensional display to one or more operators of an aircraft including:
   a flight path vector symbol; a landing pad symbol; a waypoint symbol positioned at some altitude above the landing pad symbol; a nearest predicted stopping symbol; a preferred stopping distance symbol; and a predicted stopping location symbol, wherein the instructions are further configured to cause the processor to:
   communicate with a Global Positioning System to receive a current location of the aircraft relative to a landing pad;
   receive a maximum deceleration of the aircraft from the memory;
   calculate a deceleration of a lower bound of a preferred stopping distance and a deceleration of an upper bound of the preferred stopping distance;
   display the landing pad symbol on a graphic user interface of the three-dimensional display at a predetermined position, wherein the landing pad symbol is positioned on a ground of the three-dimensional display;
   calculate predicted stopping ground locations of the upper bound and the lower bound based on the deceleration of the upper bound and the deceleration of the lower bound; and
   display the preferred stopping distance symbol on the graphic user interface of the three-dimensional display at the predicted stopping ground locations, wherein the preferred stopping distance symbol is configured to indicate a range of points at which an aircraft operator may start decelerating the aircraft to reach hover above the landing pad.

8. The system of claim 7, wherein the predicted stopping location symbol is displayed if a deceleration is less than zero.

9. The system of claim 7, wherein the landing pad symbol and the waypoint symbol are positioned at a pre-determined latitude and longitude.

10. The system of claim 7, wherein the predicted stopping location symbol is displayed on the ground of the three-dimensional display.

11. The system of claim 7, wherein the landing pad symbol is positioned on a runway, building, or an elevated terrain.

12. The system of claim 7, wherein an upper point of the preferred stopping distance symbol is a percentage of a maximum deceleration.

13. One or more non-transitory computer-readable storage media storing instructions that, when executed by one or more processors, cause the one or more processors to perform operations comprising:

communicate with a Global Positioning System to receive a current location of an aircraft relative to a landing pad;

receive a maximum deceleration of the aircraft from memory;

calculate a deceleration of a lower bound of a preferred stopping distance and a deceleration of an upper bound of the preferred stopping distance;

display a landing pad symbol on a graphical user interface of a three-dimensional display at a predetermined position, wherein the landing pad symbol is positioned on a ground of the three-dimensional display;

calculate predicted stopping ground locations of the upper bound and the lower bound based on the deceleration of the upper bound and the deceleration of the lower bound;

display a flight path vector symbol, a landing pad symbol, a waypoint symbol positioned at some altitude above the landing pad symbol, a nearest predicted stopping symbol, and a predicted stopping location symbol on the graphical user interface of the three-dimensional display; and display a preferred stopping distance symbol on the graphical user interface of the three-dimensional display at the predicted stopping ground locations, wherein the preferred stopping distance symbol is configured to indicate a range of points at which an aircraft operator may start decelerating the aircraft to reach hover above the landing pad.

14. The one or more non-transitory computer-readable storage media of claim 13, wherein the predicted stopping location symbol is displayed if a deceleration is less than zero.

15. The one or more non-transitory computer-readable storage media of claim 13, wherein the landing pad symbol and the waypoint symbol are positioned at a pre-determined latitude and longitude.

16. The one or more non-transitory computer-readable storage media of claim 13, wherein the predicted stopping location symbol is displayed on the ground of the three-dimensional display.

17. The one or more non-transitory computer-readable storage media of claim 13, wherein the landing pad symbol is positioned on a runway, building, or an elevated terrain.

18. The one or more non-transitory computer-readable storage media of claim 13, wherein an upper point of the preferred stopping distance symbol is a percentage of a maximum deceleration.

* * * * *